United States Patent [19]

Yasuda

[11] 4,398,219

[45] Aug. 9, 1983

[54] SWITCHING APPARATUS FOR THE RECORDING AND REPRODUCING OF PCM OR VIDEO SIGNALS

[75] Inventor: Nobuyuki Yasuda, Tokyo, Japan

[73] Assignee: Sony Corporation, Tokyo, Japan

[21] Appl. No.: 316,919

[22] Filed: Oct. 30, 1981

[30] Foreign Application Priority Data

Nov. 6, 1980 [JP] Japan .............................. 55-156240

[51] Int. Cl.³ .......................................... H04N 5/76
[52] U.S. Cl. .................................. 358/167; 358/314; 358/336; 360/38.1
[58] Field of Search ............... 358/167, 166, 170, 181, 358/310, 314, 327, 328, 126, 141, 336, 13, 160, 83; 360/38.1

[56] References Cited

U.S. PATENT DOCUMENTS

| | | | |
|---|---|---|---|
| 3,824,620 | 7/1974 | Langer ............................... | 360/38.1 |
| 4,093,959 | 6/1978 | Hedlund ............................ | 358/314 |
| 4,245,262 | 1/1981 | Ohtsu .................................. | 358/36 |

FOREIGN PATENT DOCUMENTS

| | | | |
|---|---|---|---|
| 53-86523 | 7/1978 | Japan ................................. | 358/167 |
| 53-124906 | 10/1978 | Japan ................................ | 360/38.1 |

OTHER PUBLICATIONS

An Experimental Digital Videotape Recorder, by Yokoyama, et al., SMPTE Journal, Mar. 1980, vol. 89, pp. 173–180.

Primary Examiner—Tommy P. Chin
Attorney, Agent, or Firm—Hill, Van Santen, Steadman, Chiara & Simpson

[57] ABSTRACT

A switching apparatus for PCM or video signals is disclosed which includes a circuit detecting the information inherent to a PCM signal and discriminating whether the signal recorded on a record medium is the PCM signal or video signal and a circuit automatically switching the PCM signal and the video signal.

7 Claims, 5 Drawing Figures

SWITCHING APPARATUS FOR THE RECORDING AND REPRODUCING OF PCM OR VIDEO SIGNALS

BACKGROUND OF THE INVENTION

1. Field of the Invention

The present invention relates generally to a switching apparatus for PCM (pulse code modulated) or video signals and is directed more particularly to a switching apparatus for PCM or video signals suitable for use with a PCM recording and reproducing apparatus which utilizes a VTR (video tape recorder) and so on.

2. Description of the Prior Art

With a prior art analog tape deck, the variation of sound magnitude is recorded after being converted to the magnetic force of the tape and the variation of sound in time is recorded on a tape in its travelling direction. Therefore, the properties of a head and the tape affect on the dynamic range and distortion factor of the sound, while the property of the tape transporting system affects on the sound pitch, i.e. wow and flutter, speed deviation and modulation noise. According to the PCM recording method, the variation of sound in time is once standardized, then the amplitude thereof is quantized and recorded on a tape. Therefore, according to this method, if "0" or "1" can be discriminated upon reproduction, the original waveform can be completely reproduced. By the digitization of such the signal, obtained are advantages that there are no speed deviation, no wow and flutter and no level fluctuation and so on. However, due to the fact that the frequency of a signal to be processed is high it is rather difficult that the advantage of the PCM record and reproduction is sufficiently realized in a tape recorder in which a tape is merely transported for a fixed head.

Therefore, it is known in the art that a PCM signal is recorded and reproduced by a VTR (video tape recorder) in which a tape is transported at a high speed while a head is rotated. As well known, in the VTR a video signal is frequency-modulated, horizontal and vertical synchronizing signals are added in consideration of the tape speed, rotation speed of a rotary head and so on and then, the signals are recorded on a tape.

When an audio PCM signal is recorded and reproduced by a VTR, which is used to record and reproduce a standard television signal, for example, NTSC television signal, since the format of a PCM signal must follow the standard television signal, in one field there are contained 245H for a data block, 1H for a control signal to be pliable for various applications, and horizontal and vertical synchronizing signals same as those of the standard television signal. Further, in one frame there is contained such a portion where no signal is recorded for the head switching at every vertical synchronization. Thus, a signal format different from the signal process of a video signal is used due to the necessity to time-compress a continuous input audio signal and so on.

Therefore, in a PCM recording and reproducing machine using a VTR and so on, since the suitable signal process is different between the video signal reproduction and PCM signal reproduction, the signal process must be switched, if necessary. In general, upon video signal reproduction mode, in order to decrease the drop-out noise due to a tape and so on, a so-called drop-out compensating circuit is used in which a 1H (H is the horizontal period) delay line is employed so as to use an FM signal before 1H by utilizing the line correlation of a television picture or a so-called H correlation noise reduction circuit is used to improve an S/N ratio which utilizes such fact that the line correlation of the reproduced luminance signal to a 1H delay signal is strong and a differential output thereof contains noise components with no line correlation. These circuits mentioned just above are preferable when the video signal is reproduced but is not preferred when the PCM signal is reproduced since if the digitized PCM signal passes through these circuit, its data format is deformed. Therefore, upon PCM signal reproduction mode it is necessary to change over the drop-out compensation circuit or H correlation noise reduction circuit such that the PCM signal does not pass through the above circuit.

In the art, the above change-over is carried out manually, so that the handling is rather troublesome.

OBJECTS AND SUMMARY OF THE INVENTION

Accordingly, it is an object of the present invention to provide a switching apparatus for PCM or video signals for use with an apparatus recording and reproducing a PCM or video signal, in which an information inherent to the PCM signal is detected to discriminate whether a signal recorded on a record medium is a video signal or PCM signal.

It is another object of the invention to provide a switching apparatus for PCM or video signals for use in an apparatus reproducing a video or PCM signal in which it is detected whether an incoming signal is a video signal or PCM signal and a circuit suitable for reproducing a video signal or PCM signal is automatically and accurately switched.

According to an aspect of the present invention there is provided a switching apparatus for PCM or video signals, which comprises:

(a) an input terminal supplied with a PCM signal or a video signal;

(b) an output terminal;

(c) a first means for compensating a drop-out contained in said video signal when said video signal is supplied to said input terminal;

(d) a second means for detecting a specific information signal contained in said PCM signal when said PCM signal is supplied to said input terminal; and (e) a third means for switching so as to derive said PCM signal from said input terminal to said output terminal without through said first means in response to an output of said second means.

The other objects, features and advantages of the present invention will become apparent from the following description taken in conjunction with the accompanying drawings through which the like references designate the same elements and parts.

DESCRIPTION OF THE PREFERRED EMBODIMENTS

The present invention will be hereinafter described with reference to the attached drawings.

Figure 1:
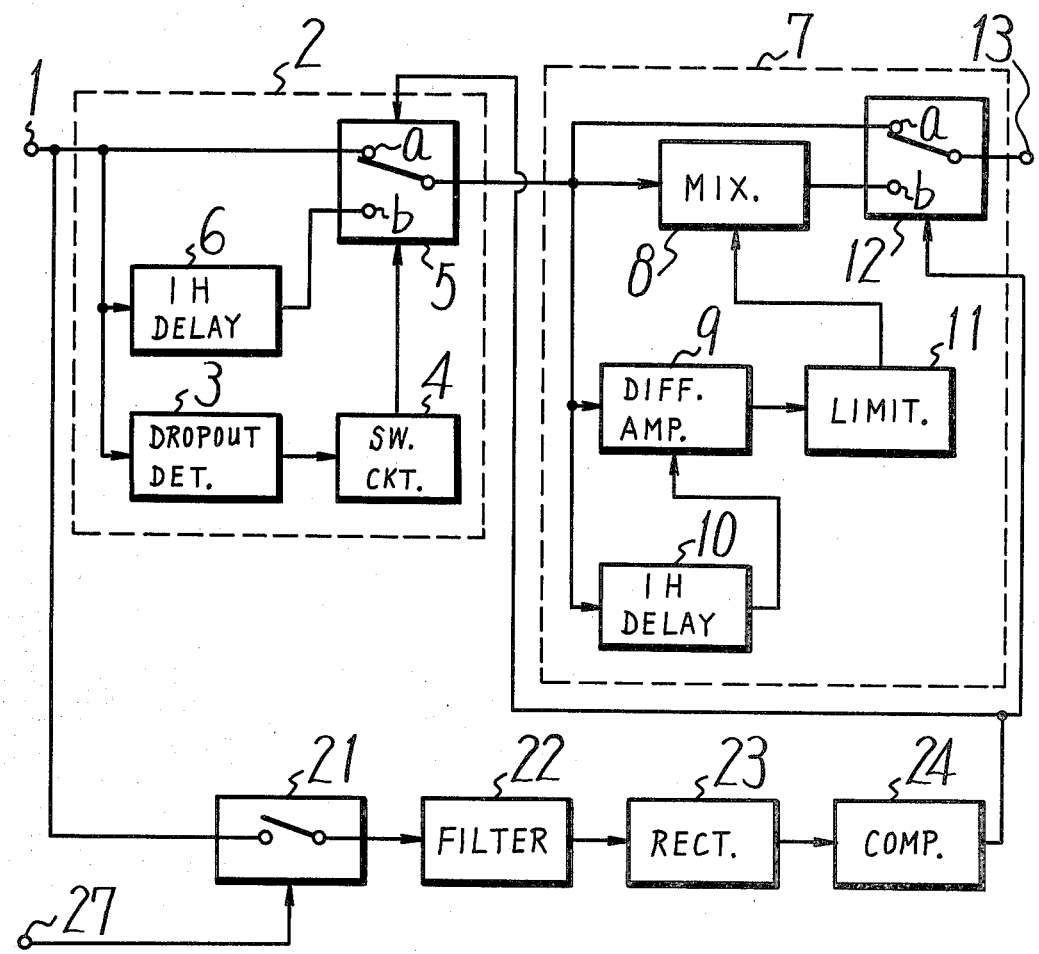
FIG. 1 is a block diagram showing an example of the switching apparatus for PCM or video signals according to the present invention.

FIG. 1 shows an example of the switching apparatus for PCM or video signals according to the invention.

In FIG. 1, 1 designates an input terminal to which a reproduced PCM or video signal from a record medium (not shown) is applied. When an drop-out is generated in the video signal applied to the input terminal 1, the drop-out is detected by a drop-out detecting circuit 3 in a drop-out compensating circuit 2. The output signal from the drop-out detecting circuit 3 is applied to a switching circuit 4 to excite the latter. Thus, the output of the switching circuit 4 is fed to a gate circuit 5 to control the same such that a contact b thereof is selected while upon a normal operation a contact a thereof is selected. Thus, a video signal before 1H from a 1H delay line 6 is derived from the gate circuit 5 to thereby compensate for a portion of the video signal where the drop-out is generated.

The output signal from the drop-out compensating circuit 2 is supplied to a noise reduction circuit 7. In the noise reduction circuit 7, the video signal whose drop-out is compensated for is directly fed to a mixer circuit 8 and also to a differential amplifier circuit 9 and a 1H delay line 10 whose output is applied to the differential amplifier circuit 9. Thus, at the output side of the differential amplifier circuit 9, obtained is a differential output between the reproduced video signal and 1H delayed signal thereof, namely noise component with no line correlation. The noise component thus derived is fed through a limiter circuit 11 to the mixer circuit 8 to be mixed with the original reproduced video signal. As a result, at the output side of the mixer circuit 8, derived is such a reproduced video signal whose S/N ratio is improved and whose drop-out is compensated for. The reproduced video signal from the mixer circuit 8 is delivered through a contact b of a gate circuit 12 to an output terminal 13.

With the circuit of FIG. 1, when a reproduced PCM signal is applied to the input terminal 1, the gate circuit 5 is switched to the contact a thereof and always held fixedly and the gate circuit 12 is also switched to its contact a to thereby deliver the PCM signal applied to the input terminal 1 directly to the output terminal 13.

In the art, the switchings of the gate circuits 5 and 12 upon the switching of the video signal and PCM signal are both carried out manually as set forth above.

The present invention is to automatically carry out the above switchings. To this end, according to a first example of the invention, a signal of a specific frequency, for example, a sine wave of the frequency of 660 KHz is superimposed and recorded on a part of a PCM signal where there are no data or equalizing pulse portion, and upon reproduction the above portion is taken out to discriminate whether the signal applied to the input terminal 1 is a PCM signal or video signal.

Figure 2:
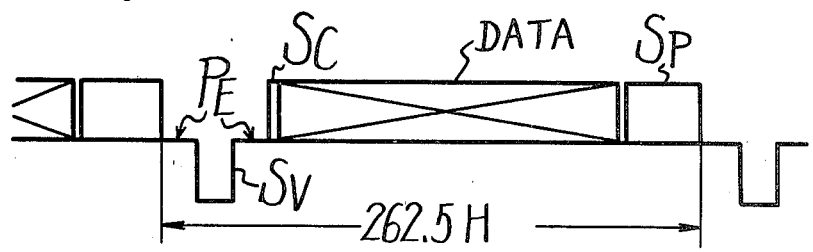
FIG. 2 is a waveform diagram of one field of a PCM signal.
Figure 3:
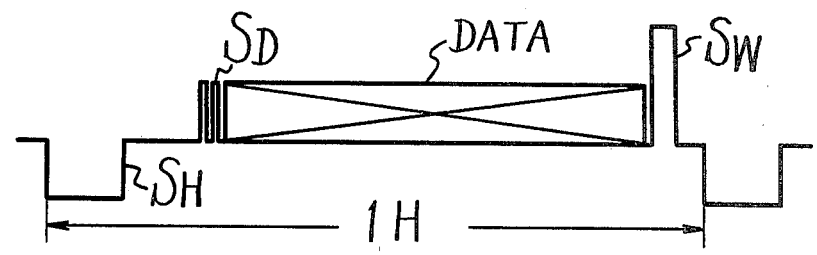
FIG. 3 is a waveform diagram of 1H of the PCM signal.

In general, according to the EIAJ normalization, a PCM format has the signal state as shown in FIGS. 2 and 3. FIG. 2 shows the arrangement and structure of the PCM signal within one field. At the head of each field, disposed are an equalizing pulse $P_E$ and a vertical synchronizing signal $S_V$. Thereafter, 1H of a control signal block $S_C$ is located at the position of 10H in an odd field but 10.5H in an even field, then 245H of a data block DATA is located, and in the remaining H located is a blank period SP with no data for the head switching (the period SP is 7.5H in the odd field and 7H in the even field). FIG. 3 shows the arrangement and structure of the PCM signal within 1H (168 bits). In this case, at the top of the data DATA (128 bits) located is a data synchronizing signal $S_D$ (4 bits) and at the last of the data DATA located is a white reference signal $S_W$ (4 bits). In FIG. 3, $S_H$ is a horizontal synchronizing signal (13 bits) located prior the data synchronizing signal $S_D$.

According to the invention, a sine wave of about 660 KHz is previously superimposed and recorded on the blank period SP or part of the equalizing pulse $P_E$. The reproduced signal supplied to the input terminal 1 is applied to a gate circuit 21 which is controlled by a gate pulse applied to an input terminal 27. As the gate pulse applied to the input terminal 27, such a pulse is used that the horizontal synchronizing pulse $S_H$ is delayed by the time corresponding to the part on which the sine wave is superimposed i.e. blank period SP or equalizing pulse $P_E$.

Thus, at the output side of the gate circuit 21, derived is the blank period SP or equalizing pulse $P_E$ at every 1H which is in turn applied to a filter circuit 22. In this case, the filter circuit 22 is so formed that it resonates to the superimposed specific frequency, for example, 660 KHz. Therefore, when the reproduced signal fed to the input terminal 1 is a PCM signal, since the sine wave of 660 KHz is superimposed on the blank period SP or portion of the equalizing pulse $P_E$, the sine wave of 660 KHz is derived from the filter circuit 22. The sine wave thus derived is fed to a detecting or rectifying circuit 23 to be converted to a DC signal which is fed to a comparing circuit 24 to be compared with a reference level. The compared output signal from the comparing circuit 24 is supplied to the gate circuits 5 and 12 as a switch signal to switch both to the contacts a. As a result, the PCM signal supplied to the input terminal 1 is delivered to the output terminal 13 as it is or without being subjected to the operation of the drop-out compensating circuit 2 and noise reduction circuit 7. In this case, the gate circuit 5 is so formed that it is dominantly switched to its contact a by the output signal from the comparing circuit 24 as compared with the output signal from the switching circuit 4.

When the video signal is supplied to the input terminal 1, since no sine wave of 660 KHz is superimposed thereon, the filter circuit 22 produces no output signal. Accordingly, the comparing circuit 24 produces no output signal so that the gate circuit 12 is switched to its contact b and the gate circuit 5 is controlled to be switched to its contact a or b by the output signal from the switching circuit 4 in accordance with whether or not there is a drop-out.

As described above, according to the example of the invention shown in FIG. 1, it is easily dicriminated whether the signal applied to the input terminal 1 is the PCM signal or video signal by detecting the signal of specific frequency superimposed on the portion of the PCM signal where no data exist upon the reproducing mode, and the switching between the PCM signal and the video signal can be automatically carried out based upon the discriminated signal.

Figure 4:
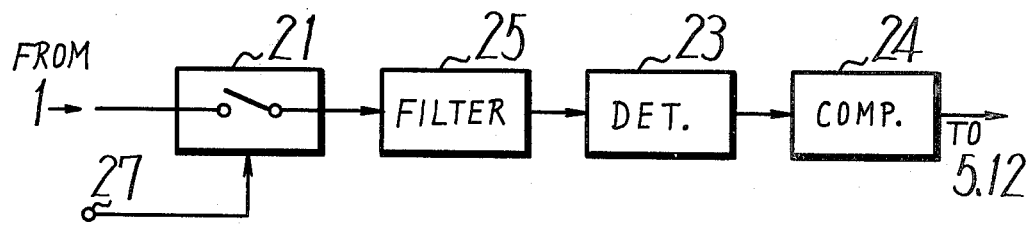
FIGS. 4 and 5 are each a block diagram showing another example of the invention.

FIG. 4 shows the main part of another example of the invention in which the parts corresponding to those of FIG. 1 are marked with the same references and their detailed description will be omitted.

The example of the invention shown in FIG. 4 is to detect the frequency component inherent to a PCM signal to discriminate whether the applied signal is the PCM signal or video signal.

That is, since the PCM signal with the format shown in FIGS. 2 and 3 has such a feature that its energy is concentrated near, for example, 1.32 MHz (at a half of the data signal 2.64 Mbit/sec), when the reproduced signal fed to the input terminal 1 is a PCM signal, a portion where $\frac{1}{2}$ bit clock component is much, for example, the portion corresponding to the data synchronizing signal or CRC is derived at every 1H by the gate circuit 21, and then fed to a filter circuit 25 which resonates to $\frac{1}{2}$ bit clock frequency. The output therefrom is applied to the detecting circuit 23 to be converted to a DC signal which is in turn fed to the comparing circuit 24 to be compared with the reference signal. Then, the compared output is supplied to the gate circuits 5 and 12 to switch them to their contacts a.

In this case, as the gate pulse applied to the input terminal 27, used is such a pulse which is prepared by delaying the horizontal synchronizing signal $S_H$ by the time corresponding to the position where $\frac{1}{2}$ bit clock components are much.

Further, since the PCM signal contains inherent frequency components much, it may be possible that without using the gate circuit 21 and so on the PCM signal is detected by a resonant filter circuit of the frequency of $\frac{1}{2}$ bit clock of the data signal of $\frac{1}{2}$ bit clock and fraction thereof by an integer, and then fed to the detecting circuit 23 to carry out the operation same as that mentioned above.

As described above, the example of the invention shown in FIG. 4 can achieve the operation and effect substantially same as those of the first example of the invention shown in FIG. 1.

Figure 5:
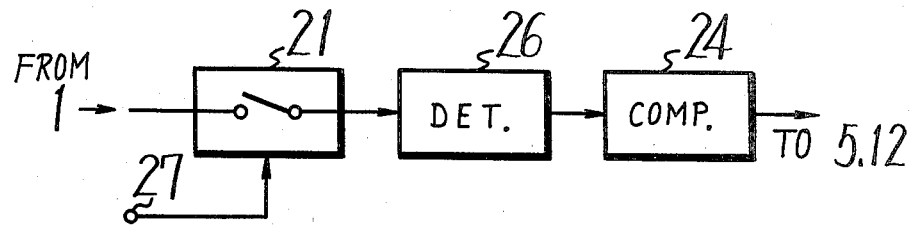

FIG. 5 shows the main part of a further example of the invention in which the parts same as those of FIG. 1 are marked with the corresponding references and their detailed description will be omitted.

According to the example of FIG. 5, the white reference signal $S_W$, which is contained in a PCM signal and shown in FIG. 3, is detected to discriminate whether the incoming reproduced signal is a PCM signal or video signal. That is, as shown in FIG. 5, a white reference signal detecting circuit 26 is provided at the rear stage of the gate circuit 21, and the gate pulse which is provided by delaying the horizontal synchronizing signal $S_H$ by the time corresponding to the part of the white reference signal $S_W$ is applied to the input terminal 27. Accordingly, at the output side of the gate circuit 21, derived is the part corresponding to the white reference signal $S_W$. Thus, when the reproduced signal applied to the input terminal 1 is a PCM signal, the white reference signal (about 0.7 V) is detected by the white reference signal detecting circuit 26 and then compared by the next stage of comparing circuit 24 with the reference level. Then, the compared output therefrom is used to switch the gate circuits 5 and 12 to their contacts a.

As set forth above, by the example of the invention shown in FIG. 5, the operation and effect substantially same as those by the first and second examples of the invention can be achieved. Further, in the example of FIG. 5, since it is needless that the detected white reference signal is further detected, the detecting circuit 23 used in the above examples become unnecessary and hence the circuit construction becomes simple.

As described above, according to the present invention, since it is discriminated whether the reproduced signal from the record medium is a PCM signal or video signal by detecting the information peculiar to the PCM signal, the switching between the video signal and the PCM signal can be performed rapidly, accurately and automatically. Thus, the apparatus become simple in handling and the operation thereof becomes improved.

It is needless that this invention is limited to the above examples only but this invention can be applied to such a technique in which a point different between a PCM signal and a video signal is detected. For example, based upon the fact that a PCM signal does not contain any color signal, it is possible that the switching between the PCM and video signals is carried out by a color to black and white switching signal.

It is needless to say that this invention can be applied to such a case where a PCM signal or video signal is reproduced not only from a magnetic tape but also from other record mediums such as a video disc with the same effect.

Further, it is needless that the arrangement of the gate circuits 5 and 12 is limited to those of the above examples, but it is, for example, possible that the gate circuit 12 is located at the input side of the noise reduction circuit 7, or after the gate circuit 5 provided is a gate circuit for only the switching signal and this gate circuit is switched by the compared output from the comparing circuit 24.

The above description is given on preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A switching apparatus for PCM or video signals, comprising:
   (a) an input terminal supplied with a PCM signal or a video signal;
   (b) an output terminal;
   (c) a first means coupled to said input terminal for compensating a drop-out contained in said video signal when said video signal is supplied to said input terminal;
   (d) a second means coupled to said input terminal for detecting a specific information signal contained in said PCM signal when said PCM signal is supplied to said input terminal; and
   (e) a third means coupled to said second means for switching so as to derive said PCM signal from said input terminal to said output terminal without through said first means in response to an output of said second means.

2. A switching apparatus as claimed in claim 1, wherein said specific information signal contained in the PCM signal is a signal which has a specific frequency and is previously inserted into the PCM signal and said third second means is a filter circuit which extracts the signal of the specific frequency.

3. A switching apparatus as claimed in claim 1, wherein said specific information signal contained in the PCM signal is a frequency component inherent to the PCM signal and said second means is a filter circuit which extracts said inherent frequency component.

4. A switching apparatus as claimed in claim 1, wherein said specific information signal contained in the PCM signal is a white reference signal contained in the PCM signal and said second means is a circuit extracting said white reference signal.

5. A switching apparatus as claimed in claim 1, further comprising:
   (A) a fourth means connected in series to said first and third means for reducing noise contained in the video signal; and
   (B) a fifth means coupled to said third means for delivering the PCM signal to said output terminal without passing through said fourth means by the output from said second means when the PCM signal is supplied to said input terminal.

6. A switching apparatus as claimed in claim 5, wherein said third or fifth means is always connected to said first or fourth means respectively and said input and output terminals are connected directly by said third and fifth means.

7. A switching apparatus as claimed in claim 1 or 5 further comprising:
   (C) a gate circuit connected between said second means and said input terminal,
      said gate circuit being operated by a pulse corresponding to one horizontal synchronizing signal period formed in said PCM signal to thereby pass therethrough said PCM signal by a predetermined period of time.

* * * * *